(12) United States Patent
Hickenboth et al.

(10) Patent No.: US 9,133,362 B2
(45) Date of Patent: Sep. 15, 2015

(54) COATING COMPOSITION HAVING MECHANOCHROMIC CRYSTALS

(75) Inventors: Charles R. Hickenboth, Cranberry Township, PA (US); Gregory J. McCollum, Gibsonia, PA (US); Elizabeth Furar, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 337 days.

(21) Appl. No.: 13/549,818

(22) Filed: Jul. 16, 2012

(65) Prior Publication Data

US 2014/0013864 A1  Jan. 16, 2014

(51) Int. Cl.
*G01L 1/24* (2006.01)
*C09D 175/04* (2006.01)
*B82Y 30/00* (2011.01)

(52) U.S. Cl.
CPC ............... *C09D 175/04* (2013.01); *G01L 1/24* (2013.01); *B82Y 30/00* (2013.01)

(58) Field of Classification Search
CPC ........... C09D 175/04; G01L 1/24; B82Y 5/00
USPC ............................. 73/862.624, 762, 777, 760
See application file for complete search history.

(56) References Cited

U.S. PATENT DOCUMENTS

| | | | |
|---|---|---|---|
| 3,829,401 A * | 8/1974 | Futaki | 503/218 |
| 4,405,733 A * | 9/1983 | Williams et al. | 524/87 |
| 4,685,783 A | 8/1987 | Heller et al. | |
| 4,931,220 A | 6/1990 | Haynes et al. | |
| 5,166,345 A | 11/1992 | Akashi et al. | |
| 5,236,958 A | 8/1993 | Miyashita | |
| 5,252,742 A | 10/1993 | Miyashita | |
| 5,320,784 A * | 6/1994 | Miyashita | 252/583 |
| 5,359,085 A | 10/1994 | Iwamoto et al. | |
| 5,488,119 A | 1/1996 | Fischer-Reimann et al. | |
| 5,645,767 A | 7/1997 | Van Gemert | |
| 5,658,501 A | 8/1997 | Kumar et al. | |
| 5,698,141 A | 12/1997 | Kumar | |
| 5,723,072 A | 3/1998 | Kumar | |
| 5,770,115 A | 6/1998 | Misura | |
| 5,821,287 A | 10/1998 | Hu et al. | |
| 6,022,497 A | 2/2000 | Kumar | |
| 6,080,338 A | 6/2000 | Kumar | |
| 6,113,814 A | 9/2000 | Gemert et al. | |
| 6,136,968 A | 10/2000 | Chamontin et al. | |
| 6,153,126 A | 11/2000 | Kumar | |
| 6,244,171 B1 * | 6/2001 | Kayser | 100/35 |
| 6,296,785 B1 | 10/2001 | Nelson et al. | |
| 6,348,604 B1 | 2/2002 | Nelson et al. | |

(Continued)

FOREIGN PATENT DOCUMENTS

EP     1833936 B1     9/2007

OTHER PUBLICATIONS

Benjamin Viel et al., Reversible Deformation of Opal Elastomers, Oct. 24, 2007, American Chemical Society, Chem. Mater. 2007, 19, 5673-5679.*

Stephen H. Foulger et al., Mechanochromic Response of Poly(ethylene glycol) Methacrylate Hydrogel Encapsulated Crystalline Colloidal Arrays, Aug. 23, 2001, American Chemical Society, Langmuir 2001, 17, 6023-6026.*

(Continued)

*Primary Examiner* — Max Noori
(74) *Attorney, Agent, or Firm* — Julie Meder

(57) ABSTRACT

A mechanochromic coating composition is disclosed comprising a binder composition and a crystalline mechanophore. The mechanophore changes color upon application of a mechanical load to the coating composition.

20 Claims, 1 Drawing Sheet

(56) References Cited

U.S. PATENT DOCUMENTS

| | | | |
|---|---|---|---|
| 6,353,102 B1 | 3/2002 | Kumar | |
| 6,441,066 B1 | 8/2002 | Woodworth et al. | |
| 6,555,028 B2 | 4/2003 | Walters et al. | |
| 6,630,597 B1 | 10/2003 | Lin et al. | |
| 6,736,998 B2 | 5/2004 | Petrovskaia et al. | |
| 6,875,800 B2 | 4/2005 | Vanier et al. | |
| 6,894,086 B2 | 5/2005 | Munro et al. | |
| 7,094,368 B2 | 8/2006 | Kim et al. | |
| 7,116,357 B1 | 10/2006 | Oya et al. | |
| 7,438,972 B2 | 10/2008 | Faler et al. | |
| 7,481,955 B2 | 1/2009 | Xiao | |
| 7,527,754 B2 | 5/2009 | Chopra | |
| 7,556,750 B2 | 7/2009 | Xiao et al. | |
| 7,556,751 B2 | 7/2009 | Chopra et al. | |
| 7,582,231 B2* | 9/2009 | Foulger et al. | 252/588 |
| 7,605,194 B2 | 10/2009 | Ferencz et al. | |
| 7,723,405 B2* | 5/2010 | Braun et al. | 523/212 |
| 7,907,346 B2 | 3/2011 | Swarup et al. | |
| 8,815,771 B2* | 8/2014 | Chopra et al. | 503/201 |
| 2003/0174560 A1 | 9/2003 | Dahmen et al. | |
| 2003/0224917 A1* | 12/2003 | Lutz | 492/58 |
| 2007/0071680 A1* | 3/2007 | Ribi | 424/9.1 |
| 2010/0206088 A1 | 8/2010 | Potisek et al. | |
| 2010/0236682 A1* | 9/2010 | Patient et al. | 152/450 |
| 2011/0008498 A1* | 1/2011 | Ribi | 426/87 |
| 2011/0148984 A1* | 6/2011 | Ribi | 347/37 |
| 2012/0091699 A1* | 4/2012 | Krueger et al. | 283/67 |
| 2012/0133521 A1* | 5/2012 | Rothkopf et al. | 340/636.1 |
| 2012/0244779 A1* | 9/2012 | Cernohous et al. | 446/220 |
| 2012/0266806 A1* | 10/2012 | Ribi | 116/206 |
| 2013/0210053 A1* | 8/2013 | Fraser et al. | 435/29 |
| 2013/0340188 A1* | 12/2013 | Patel et al. | 15/167.1 |
| 2014/0336071 A1* | 11/2014 | Salaita et al. | 506/9 |

OTHER PUBLICATIONS

Wilhelm T.S. Huck, Responsive polymers for nanoscale actuation, Jul.-Aug. 2008, materialstoday, vol. 11, No. 7-8, pp. 24-32.*

Hiroshi Fudouzi et al., Photonic Rubber Sheets with Tunable Color by Elastic Deformation, Dec. 20, 2005, American Chemical Society, Langmuir, vol. 22, No. 3, 1365-1368.*

Brown, Photochromism, Techniques of Chemistry, vol. III, 1971, pp. 732-852, Wiley-Interscience, New York.

Davis et al. "Force-induced activation of covalent bonds in mechanoresponsive polymeric materials", Nature, May 7, 2009, pp. 68-72, vol. 459.

Hickenboth et al. "Biasing reaction pathways with mechanical force", Nature, Mar. 22, 2007, pp. 423-427, vol. 446.

Kingsbury et al. "Shear activation of mechanophore-crosslinked polymers", J. Mater. Chem., 2011, pp. 8381-8388, vol. 21.

Kim et al. "A mechanochromic smart material", Polymer Bulletin, 1993, pp. 367-374, vol. 31.

Lee et al. "Force-Induced Redistribution of a Chemical Equilibrium", Journal of the American Chemical Society, Oct. 26, 2010, pp. 16107-16111, vol. 132.

Potisek et al. "Mechanophore-Linked Addition Polymers", Journal of the American Chemical Society, Oct. 24, 2007, pp. 13808-13809, vol. 129.

Potisek, Mechanophore-linked polymers for studying mechanochemical response, University of Illinois at Urbana-Champaign, 2008, pp. 1-23.

White et al., Oxidation of Triarylimidazoles. Structures of the Photochromic and Piezochromic Dimers of Triarylimidazyl Radicals, Journal of the American Chemical Society, Aug. 20, 1966, pp. 3825-3829, vol. 88:16.

\* cited by examiner

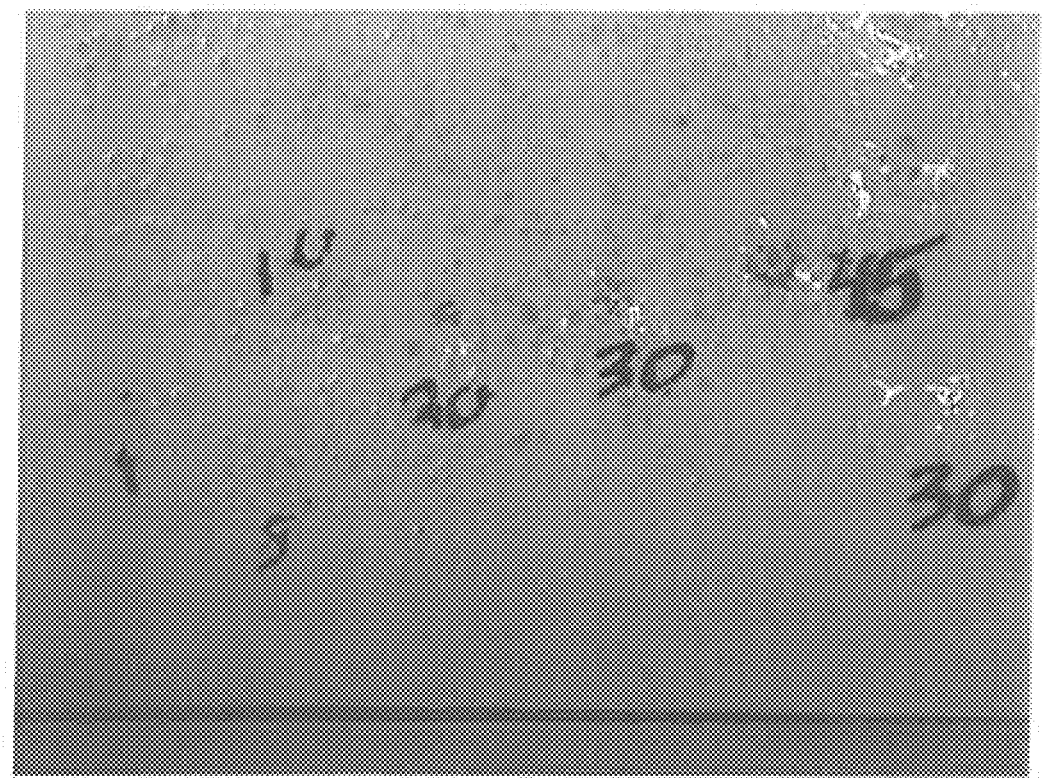

COATING COMPOSITION HAVING MECHANOCHROMIC CRYSTALS

BACKGROUND OF THE INVENTION

1. Field of the Invention

The present invention is directed to coating compositions comprising mechanochromic crystals that change color upon application of a load to the coating composition.

2. Description of Related Art

Polymeric materials are often used to coat various structural components in many industries, such as aerospace components, medical devices, turbines (as used in wind energy and generation and in manufacturing), and the like. These components may become damaged or stressed during use. Oftentimes, the damage or stress to an underlying structural component is not clearly visible. The structural components and the polymeric coating on these components are subjected to a variety of forces that impart elongation, compression, and shear stresses. These forces hasten the fatigue within the component and increase the risk of catastrophic failure of the component. Therefore, these components are routinely examined for structural integrity using visual and non-visual techniques, particularly when a sudden failure presents risk to equipment or human safety. This practice consumes valuable time and resources, and hidden dangers are often difficult or impossible to detect. Thus, catastrophic failures can occur within such components with little or no warning.

The ability to detect damage as it occurs and locate the area of damage would be helpful. In particular, materials that self-report the state of damage and stress applied thereto are helpful in eliminating or minimizing the failure of the underlying structural component.

SUMMARY OF THE INVENTION

The present invention includes a mechanochromic coating composition that comprises a binder composition and a crystalline mechanophore, wherein the mechanophore changes color upon application of a mechanical load to the coating composition. Also included in the present invention is a method of making a mechanochromic coating composition including preparing a binder composition comprising polymeric precursor components, dispersing a crystalline mechanophore in the binder composition, and curing the binder composition to form a cured polymer such that the crystalline mechanophore is retained within the cured polymer. The present invention is particularly useful in determining whether a mechanical load has been applied to an article by coating an article with the mechanochromic coating composition of the present invention and detecting a color change of the coating composition, where the color change indicates that the coating composition has been subjected to a mechanical load.

BRIEF DESCRIPTION OF THE DRAWING

FIG. 1 is an image of a test panel coated with the coating composition of the present invention.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids.

The present invention is directed to a mechanochromic coating composition comprising a resinous binder and a crystalline mechanophore. By "mechanophore" it is meant a component that exhibits a chemically or physically detectable structure change, such as that which produces color, when subjected to stress, also referred to herein as a mechanical load. For example, the mechanophore may have a ring structure that opens and exhibits a color when subjected to stress. Such stress may include any mechanical disruption of the component, including tensile stress, compressive stress, shear stress or the like. The mechanophore signals an area under stress by causing a color change in the material. When the mechanochromic coating composition is coated onto an article, a color change in the coating composition indicates that the article has been subject to stress, such that repair thereof prior to failure of the component or other corrective action may be warranted.

By "mechanochromic dye", or the like, it is meant that the dye exhibits mechanochromism at least when included in a coating composition. By "crystalline", it is meant that the mechanophore is present in the coating composition as a separate and distinct phase from the resinous binder and is not bound to the binder or dissolved in the binder or in a solvent or other carriers. In one embodiment of the invention, the mechanophore crystals are sized 10-10,000 nm in diameter or largest dimension.

The crystalline mechanophore may be an organic mechanochromic material having an activated absorption maxima in the range from 300 to 1000 nm. In one embodiment, the mechanochromic material comprises a mixture of (a) a mechanochromic material having a visible lambda max of from 400 to less than 550 nm, and (b) a mechanochromic material having a visible lambda max of from 550 to 700 nm.

The mechanophore may alternatively comprise an organic mechanochromic material that may be chosen from pyrans, oxazines, fulgides, fulgimides, diarylethenes, lactone dimers, imidazole dimers, and mixtures thereof.

Non-limiting examples of mechanochromic pyrans that may be used herein include benzopyrans and naphthopyrans, e.g., naphtho[1,2-b]pyrans, naphtho[2,1-b]pyrans, indeno-fused naphthopyrans and heterocyclic-fused naphthopyrans, spiro-9-fluoreno[1,2-b]pyrans, phenanthropyrans, quinolinopyrans; fluoroanthenopyrans and spiropyrans, e.g., spiro(benzindoline)naphthopyrans, spiro(indoline)benzopyrans, spiro(indoline)naphthopyrans, spiro(indoline)quinolinopyrans and spiro(indoline)pyrans and mixtures thereof. Non-limiting examples of such pyrans are disclosed in U.S. Pat. No. 5,645,767 at column 2, line 16 to column 12, line 57; U.S. Pat. No. 5,723,072 at column 2, line 27 to column 15, line 55; U.S. Pat. No. 5,698,141 at column 2, line 11 to column 19, line 45; U.S. Pat. No. 6,022,497 at column 2, line 21 to column 11, line 46; U.S. Pat. No. 6,080,338 at column 2, line 21 to column 14, line 43; U.S. Pat. No. 6,136,968 at column 2, line 43 to column 20, line 67; U.S. Pat. No. 6,153,126 at column 2, line 26 to column 8, line 60; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; U.S. Pat. No. 6,630,597 at column 2, line 16 to column 16, line 23; U.S. Pat. No. 6,736,998 at column 2, line 53 to column 19, line 7; U.S. Pat. No. 7,094,368 at column 2, line 39 to column 10, line 22; U.S. Pat. No. 7,116,357 at column 4, line 13 to column 37, line 34; U.S. Pat. No. 7,481,955 at column 2, line 42 to column 25, line 51; U.S. Pat. No. 7,527,754 at column 2, line 65 to column 16, line 10; U.S. Pat. No. 7,556,750 at column 2, line 55 to column 29, line 55; U.S. Pat. No. 7,556,751 at column 3, line 43 to column 24, line 38; and U.S. Pat. No. 7,907,346 at column 9, line 59 to column 30, line 61; the cited portions of which are incorporated herein by reference.

Further non-limiting examples of naphthopyrans and complementary organic mechanochromic substances are described in U.S. Pat. No. 5,658,501 at column 1, line 64 to column 13, line 17, which disclosure is incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of mechanochromic oxazines that may be used include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, spiro(indoline)quinoxazine and mixtures thereof.

Examples of mechanochromic fulgides or fulgimides that may be used include: fulgides and fulgimides, which are disclosed in U.S. Pat. No. 4,685,783 at column 1, line 57 to column 5, line 27, and in U.S. Pat. No. 4,931,220 at column 1, line 39 through column 22, line 41; the disclosure of such fulgides and fulgimides are incorporated herein by reference. Non-limiting examples of diarylethenes are disclosed in U.S. Patent Application Publication No. 2003/0174560 paragraphs [0025] to [0086].

Polymerizable organic mechanochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymeric matrix compatibilized naphthopyran of U.S. Pat. No. 6,555,028 at column 2, line 40 to column 24, line 56 may be used. The disclosures of the aforementioned patents on polymerizable organic mechanochromic materials are incorporated herein by reference.

Examples of mechanochromic imidazole dimers include 2,4,5-triarylimidazoles. Suitable lactone dimers include di(benzofuranone)s. Other suitable mechanophores include piroxicam and indandiones such as 2,2'-bis[4-(dimethylamino)phenyl]-1,3-indandione.

The coating composition comprising a crystalline mechanophore includes a binder composition. In certain embodiments, the binder composition can be a primer coating or undercoat. An undercoat can comprise, for example, an epoxy-amine resin, epoxy-polyamide resin, a polyurethane resin, or other coating composition. Examples of primer coatings include those based on epoxy resins cured with an amino-functional curing agent such as an amino-functional polyamide and/or an aralphatic diamine, and cross-linked polyurethane. A primer coating can include an anticorrosive pigment such as a chromate, phosphate, phosphonate or molybdate and/or may contain one or more other pigments and/or fillers. A primer coating can be applied from a solution or dispersion in an organic solvent or can be a high solids or solventless composition, or can be applied as an aqueous composition. Epoxy-amine based primers include chromate epoxy-amine based primers such as DESOPRIME HS CA 7700/CA, non-chromate primers such as "DeSoto Military Polyamide Primer, 513," and non-chromate water-borne epoxy primers such as "DeSoto Military Water-Borne Primer," each of which is commercially available from PRC-DeSoto International, Inc.

In other embodiments, the binder composition can be a top coat. The top coat can comprise a polyurethane resin. A top coat, particularly for aviation and aerospace vehicle coatings, can be a polyurethane such as a polyester-urethane, although other curable coatings such as polyester, fluoropolymer or acrylic polymer coatings, based for example on oxazolidine-functional acrylic polymers, can be used. Examples of polyurethane top coats include any of the DESOTHANE HS CA 8000 polyurethane top coats commercially available from PRC-DeSoto International, Inc. A top coat can be, for example, a curable coating comprising two or three co-reactive components that are usually packaged separately and mixed at application (for example by twin-feed spray) or shortly before application. A top coat can be applied, for example, from an organic solvent solution, from a dispersion in water and/or organic solvent, or from an aqueous solution or dispersion containing solubilizing and/or dispersing agents.

Alternatively, the binder composition may comprise a coating composition that is suitable as an intermediate layer in a multi-layer coating system, i.e., a layer positioned between a primer layer or undercoat and a top coat. Suitable materials for an intermediate layer binder composition included DESOTHANE HD CA 9000 basecoat or DESOTHANE HS CA 8000 polyurethane top coat, commercially available from PRC-DeSoto International, Inc. A clearcoat coating composition may be applied directly over the mechanochromic coating composition.

The mechanochromic coating composition of the present invention may be prepared by adding the crystalline mechanophore to the binder composition at any appropriate stage depending at least in part on a desired location and concentration of the mechanophore therein. For example, in certain embodiments, it may be desirable to disperse the mechanophore uniformly in the binder composition as is conventional for inclusion of additives in coatings. Uniform distribution of the mechanophore in the binder composition may be achieved by adding the mechanophore to the binder composition as an additive in the manner of conventional coating additives, such that crystalline mechanophore is retained within the binder composition as a distinct phase.

Alternatively, the mechanophore may be added to the binder composition after the binder composition is applied to a substrate but before the binder composition cures or dries to an extent that prevents addition of the mechanophore thereto. The binder composition is applied by any appropriate method to a substrate. While at least a portion of the upper surface of the binder composition is still tacky or sticky to the touch, the mechanophore is applied to at least a portion of the tacky binder composition upper surface such that the mechanophore becomes incorporated therein. The crystalline mechanophore may be applied to the binder composition upper surface by any appropriate methods such as brushing, spraying, dusting, sieving, or the like. Upon drying or curing of the binder composition, the crystalline mechanophore becomes incorporated in and trapped within the binder composition and is retained therein as a distinct phase.

In certain embodiments, the coating composition of the present invention includes other optional components, such as those well known in the art of formulating surface coatings. Such optional components may include, for example, surface active agents, flow control agents, thixotropic agents, anti-gassing agents, antioxidants, light stabilizers, UV absorbers, and other customary auxiliaries. Any such additives known in the art can be used, absent compatibility issues.

In certain embodiments, the mechanophore used in the coating composition of the present invention may be activated upon exposure to ultraviolet radiation. As such, it may be desirable to include a UV absorber in the coating composition in order to prevent any false positives of a photochromic response to UV by the coating composition of the present invention. Suitable UV absorbers include those described in U.S. Pat. No. 5,770,115, incorporated herein by reference.

In certain embodiments, the coating composition of the present invention may include a colorant. As used herein, the term "colorant" means any substance that imparts color and/or other opacity and/or other visual effect to the composition. The colorant can be included in the coating composition in any suitable form, such as discrete particles, dispersions, solutions, and/or flakes. A single colorant or a mixture of two or more colorants can be used in the coatings of the present invention. It should be understood that the inclusion of colorants in the coating composition of the present invention may contrast or complement the color change that is exhibited by the mechanophore included in the polymeric network of the present invention.

Example colorants include pigments, dyes, and tints, such as those used in the paint industry and/or listed by the Dry Color Manufacturers Association (DCMA), as well as special-effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based, such as pthalo green or blue, iron oxide, bismuth vanadate, anthraquinone, perylene, aluminum, and quinacridone.

Example tints include, but are not limited to, pigments dispersed in water-based or water-miscible carriers, such as AQUA-CHEM 896, commercially available from Degussa, Inc., CHARISMA COLORANTS and MAXITONER INDUSTRIAL COLORANTS, commercially available from Accurate Dispersions, a division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. Pat. No. 7,438,972 and U.S. Pat. No. 7,605,194, which are incorporated herein by reference.

Example special effect compositions that may be used in the compositions of the present invention include pigments and/or compositions that produce one or more appearance effects, in addition to the mechanochromic effect, such as reflectance, pearlescence, metallic sheen, phosphorescence, fluorescence, photochromism, photosensitivity, thermochromism, goniochromism, and/or color change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions of the present invention.

The coating compositions of the present invention can be prepared by any suitable technique, including those described in the Examples herein. The coating components can be mixed using, for example, stirred tanks, dissolvers including inline dissolvers, bead mills, stirrer mills, or static mixers, among others. Where appropriate, it is carried out with exclusion of actinic radiation in order to prevent damage to the coating of the invention, which is curable with actinic radiation. In the course of preparation, the individual constituents of the mixture according to the invention can be incorporated separately. Alternatively, the mixture of the invention can be prepared separately and mixed with the other constituents.

The following Examples are presented to demonstrate the general principles of the invention. The invention should not be considered as limited to the specific Examples presented. All parts are by weight unless otherwise indicated.

EXAMPLES

Example 1

A DESOTHANE HS CA8000/B7067 top coat (commercially available from PPG Aerospace PRC-Desoto International, Inc.) was prepared according to the manufacturer's technical data sheet and applied over a Q-panel QD-412 smooth finish steel panel and fully cured, yielding a white topcoated panel.

The following components were mixed together by shaking to prepare a clearcoat coating composition:

| Clearcoat Coating Composition | | |
|---|---|---|
| Component | Description | Parts by weight |
| D8150* | clearcoat | 6.0 |
| D8371* | medium hardener | 2.2 |
| D871* | medium thinner | 1.8 |

*Commercially available product from PPG Automotive Refinish

Once all components were thoroughly blended, the coating composition was applied over the white topcoated panel via a P. G. & T. Company 4 mil gap drawdown gage.

A mechanochromic imidazole dye (MID) was prepared as described by White et al. (J. Am. Chem. Soc. 1966, 88, pages 3825-3826). The resulting light yellow material was found to be mechanochromic, exhibiting a deep purple material upon rubbing and grinding. The purple color reverts to light yellow within several days. The dye was lightly dusted on the surface of the drawdown coating composition immediately after application and before the coating was tack free. The panel was dried overnight at ambient conditions then baked for 2 hours at 104° F. The mechanochromic responses of the coated panel were tested using a BYK Gardner Impact tester and rubbing are reported in Table 1.

Comparative Example 1

Example 1 was repeated except that a dye solution was prepared by adding 18 g of solvent (m-pyrol) to 2 g MID followed by shaking until dissolution was complete. The dye solution was then added to 8 g of clearcoat coating composition, followed by shaking to mix the components. Once all of the components were thoroughly blended, the coating was applied over a white top coat panel as described in Example 1. The panel was dried overnight at ambient conditions then baked for 2 hours at 104° F. The mechanochromic responses of the coated panel were tested using a BYK Gardner Impact tester and rubbing are reported in Table 1.

TABLE 1

| | Observations | |
|---|---|---|
| Test method | Example 1 | Comparative Example 1 |
| Gardner Impact at 10, 20, 30, 40 in-lbs | yellow to purple color shift within impact area | no color shift |
| gentle rubbing | yellow to purple color shift within rubbed area | no color shift |
| firm rubbing | yellow to purple color shift within rubbed area | no color shift |

Example 2

Example 1 was repeated except MID was replaced with dye 7-106, a commercially available indenonaphthopyran which is available from PPG Industries, Inc. The material was shown to be both photochromic in solution and in the solid state (yellow to purple transition), as well as mechanochromic upon grinding (yellow to purple transition), which takes several days to weeks to return to its original color.

An image of the panel after impact is shown in FIG. 1. The numbers written thereon indicate the Garder Impact (in-lbs) applied to the coated panel. Some variation in mechanochromic activity is shown, which is believed to be a result of the variation in the thickness of the coating above the crystals. For example, the two impacts at 30 in-lbs provided different levels of colorization.

The concentration of crystalline mechanophore in the coating composition and the location of the mechanophore through the thickness of the coating composition can be adjusted to control the sensitivity of the coating composition to stress. For example, a component that normally receives an acceptable stress level during normal use may be coated with a coating composition having a lower concentration of mechanophores (i.e., is less sensitive to stress) than an article that is not stressed during normal use and may require a more sensitive coating composition applied thereto. It may be beneficial for the color change to last a period of time before reverting to the original color, such as to last for at least two days.

In addition, the color change may be apparent in a coating composition of the present invention that contains a colorant or one that does not contain a colorant. The energy required to obtain a color change in the coating composition is provided by the load applied to the material. In a situation where the coating composition does not contain a colorant, a load may exhibit color in an otherwise uncolored coating. Such a color may only be detectable upon application of a predetermined or sufficient load. For example, a load that is below a threshold amount for a particular component may not exhibit a color. However, when the threshold load is exceeded, the color becomes evident. For a colored coating composition, the load may result in a color change or shift when the material is sufficiently stressed. In addition, the color change may be reversible or may have an extended lifetime. For example, in certain applications, it may be desirable to have a color shift that lasts the lifetime of the component as an indication that the component had received a certain amount of stresses over its lifetime.

The mechanochromic coating composition of the present invention may be used as a coating underlying a structural component (e.g., an airplane fuselage or a turbine blade) or in composite structures such as windshields or other transparencies. A color change exhibited by the component bearing the coating composition of the present invention may present various indications depending on the end use of the mechanochromic coating composition. For example, the mechanochromic coating composition may be used to indicate that a particular structure has received an excessive load and may be damaged and/or prone to failure, such that repair or replacement is needed.

Alternatively, components that traditionally require a certain degree of load to establish their integrity may exhibit a color upon application of the appropriate load thereto. For example, a set of components that are joined together by a fastener (a bolt or the like) may be coated with the mechanochromic coating composition. Upon sufficient loading of the fastener that joins the two components, the mechanochromic coating composition would exhibit a color change, thereby indicating that the two components are properly aligned and/or joined. These uses of the mechanochromic coating composition of the present invention are not meant to be limiting. The coating composition may be used in various applications where it is desired to obtain information regarding the amount of load applied to a component.

The mechanochromic coating composition of the present invention may also be used as a tamper indicator. Upon tampering with a component bearing the coating composition of the present invention, the mechanochromic coating composition may exhibit a color change that indicates that excessive force was used to open or otherwise tamper with the component, which may also indicate that the integrity of the component was compromised. The mechanochromic coating composition may also be used for warranty mitigation. Upon indication of a color or color change by a component coated with the mechanochromic coating composition, the user of a component may become alerted to the possibility that the component was subjected to a certain degree of force and there may be latent damage thereto, thereby mitigating a warranty claim.

Although the present invention has been described with reference to specific details of certain embodiments thereof, it is not intended that such details should be regarded as limitations upon the scope of the invention except insofar as they are included in the accompanying claims.

The invention claimed is:

1. A mechanochromic coating composition comprising:
   a binder composition; and
   a crystalline mechanophore, wherein said mechanophore exhibits a chemical change and changes color upon application of a mechanical load to said coating composition, wherein the mechanophore has a ring structure and the chemical change comprises opening of said ring structure.

2. The mechanochromic coating composition of claim 1, wherein said mechanophore crystals are dispersed within said binder composition without chemical bonding thereto.

3. The mechanochromic coating composition of claim 2, wherein said binder composition comprises polyurethane, polyester or an acrylic polymer.

4. The mechanochromic coating composition of claim 1, wherein said mechanophore comprises a spiropyran, a spirooxazine, an indenonaphthopyran, a lactone, and/or imidazole dimer.

5. The mechanochromic coating composition of claim 4, wherein said mechanophore crystals are sized 10-10,000 nm.

6. The mechanochromic coating composition of claim 1, wherein said mechanophore changes color upon application of a mechanical load in excess of a predetermined level.

7. The mechanochromic coating composition of claim 6, wherein the color change lasts for at least 2 days.

8. A method of making a mechanochromic coating composition comprising:
   preparing a binder composition; and
   dispersing a crystalline mechanophore into the binder composition, wherein said mechanophore exhibits a chemical change and changes color when subjected to a mechanical load, said mechanophore having a ring structure and the chemical change comprises opening of the ring structure.

9. The method of claim 8, wherein the binder comprises polymeric precurser components and said method further comprising curing the binder composition to form a cured polymer, such that said crystalline mechanophore is retained within the cured polymer.

10. The method of claim 9, wherein the crystalline mechanophore is dispersed into the coating composition by:
    applying the crystals to a surface of the binder composition; and
    allowing the crystals to be incorporated into the binder composition prior to curing thereof.

11. The method of claim 8, wherein the mechanophore crystals are dispersed within the binder composition without chemical bonding thereto.

12. The method of claim 11, wherein the binder composition comprises a polyurethane, polyester or an acrylic polymer.

13. The method of claim 8, wherein the mechanophore comprises a spiropyran, a spirooxazine, an indenonaphthopyran, a lactone dimer, or imidazole dimer.

14. The method of claim 13, wherein said mechanophore crystals are sized 10-10,000 nm.

15. A method of determining whether a mechanical load has been applied to an article comprising:
    coating an article with the mechanochromic coating composition of claim 1; and
    detecting a color change of the coating composition, the color change indicating that the coating composition has been subjected to a mechanical load.

16. The method of claim 15, wherein the binder composition comprises a polyurethane, polyester, and an acrylic polymer.

17. The method of claim 15, wherein the color change occurs upon the article receiving a mechanical load in excess of a predetermined load.

18. The method of claim 17, wherein the color change lasts at least 2 days.

19. An article coated with the mechanochromic coating composition of claim 1.

20. The article of claim 19, wherein the mechanophore comprises a spiropyran, a spirooxazine, an indenonaphthopyran, a lactone dimmer, and/or imidazole dimer.

* * * * *